United States Patent [19]

Im et al.

[11] Patent Number: 4,965,135

[45] Date of Patent: Oct. 23, 1990

[54] MULTILAYER FILM WITH DEAD FOLD AND TWISTABILITY CHARACTERISTICS

[75] Inventors: Jang-hi Im, Midland, Mich.; Rexford A. Maugans, Baton Rouge, La.; David R. Kiesel, Midland, Mich.

[73] Assignee: The Dow Chemical Company, Midland, Mich.

[21] Appl. No.: 133,595

[22] Filed: Dec. 14, 1987

[51] Int. Cl.$^5$ .................. B32B 27/36; B32B 27/08; B65D 85/00

[52] U.S. Cl. .................. 428/412; 428/475.8; 428/476.1; 428/516; 428/517; 428/518; 428/520; 428/35.4; 426/127; 264/176.1; 156/244.11

[58] Field of Search .................. 428/412, 475.8, 476.1, 428/517, 518, 520, 516

[56] References Cited

U.S. PATENT DOCUMENTS

| | | |
|---|---|---|
| 2,838,404 | 6/1958 | Cohen . |
| 2,951,765 | 9/1960 | Robson . |
| 3,038,811 | 6/1962 | Reading . |
| 3,322,319 | 5/1967 | Sweeney et al. . |
| 3,395,025 | 7/1968 | Hermanson . |
| 3,407,077 | 10/1968 | Helin . |
| 3,420,679 | 1/1969 | Gifford et al. . |
| 3,615,712 | 10/1971 | Keller . |
| 3,826,441 | 7/1974 | Miles . |
| 3,867,249 | 2/1975 | Vitale et al. . |
| 3,949,114 | 4/1976 | Viola et al. . |
| 4,048,428 | 9/1977 | Baird, Jr. et al. .................. 428/518 |
| 4,190,477 | 2/1980 | Ossian et al. . |
| 4,291,085 | 9/1981 | Ito . |
| 4,338,365 | 7/1982 | Russo . |

FOREIGN PATENT DOCUMENTS 1600250 10/1981 United Kingdom .

*Primary Examiner*—P. C. Sluby

[57] ABSTRACT

A multilayer film is provided in the form of an extruded sheet for food wrapping and cooking procedures. The film is made up of alternating layers of a first generally ductile material and a second generally brittle material. Upon wrapping a food item or container, the film exhibits dead fold and/or twistability characteristics. In one embodiment, the materials of the film are chosen to have softening points above about 450 degrees F. so that the film can be used in conventional ovens.

16 Claims, No Drawings

MULTILAYER FILM WITH DEAD FOLD AND TWISTABILITY CHARACTERISTICS

BACKGROUND OF THE INVENTION

The present invention relates to multilayer plastic films, and more particularly to generally transparent multilayer plastic films for food wrapping and/or cooking applications which exhibit dead fold, creasing and/or twistability characteristics.

Presently, two distinct classes of films or foils exist for consumers to wrap and prepare foods in, namely plastic wraps and aluminum foil. Plastic wraps are typically used for wrapping foods because of their transparency and relatively low cost. Additionally, some plastic wraps based on polyvinylidene chloride can be used in microwave applications.

However, a major problem for such plastic wraps has been the tendency of the films to fail to maintain their shape and cling once they are wrapped about a food item or food container. That is, they have a tendency to spring back or recover to an unfolded state. An additional drawback to plastic wraps is that they cannot withstand conventional oven temperatures. While plastic cooking bags or pouches are commercially available and can withstand oven temperatures, such items are not available as films for food wrapping.

Aluminum foil, on the other hand, possesses excellent dead fold and shaping characteristics. That is, once the foil is wrapped about a food item or food container, it maintains its shape and does not unfold as plastic wraps tend to do. However, aluminum foil is somewhat expensive, is not transparent, and is not suitable for use in microwave ovens.

Accordingly, the need still exists in the art for a food wrapping material which is generally transparent, has good dead fold and cling characteristics, and which can withstand both microwave cooking procedures and conventional oven temperatures.

SUMMARY OF THE INVENTION

The present invention meets that need by providing multilayer film which exhibits dead fold and/or twistability characteristics and which can withstand both microwave cooking procedures and conventional oven temperatures. In accordance with one aspect of the present invention, the multilayer film of the present invention comprises alternating layers of first and second polymeric materials. The first polymeric material comprises a generally ductile material, while the second material comprises a generally brittle material. The number of alternating layers is chosen so that the plastic film exhibits dead fold, creasing and/or twistability characteristics. Further, in a preferred embodiment of the invention, the first and second polymeric materials are chosen to have a softening point of at least about 450 degrees F so that the film will withstand conventional oven temperatures. The film may be generally transparent, opaque, contain colored pigment additives, or have printing thereon as desired for a desired end use.

As used herein, the term "dead fold characteristics" means the ability of the polymeric film to retain its shape permanently once it is folded or wrapped about a food item or container and not spring back to an unfolded state. As an example, aluminum foil, once folded or shaped about an item, retains that shape and, thus, may be considered to have excellent dead fold characteristics. Conversely, typical plastic food wraps tend to quickly spring back, unfold, or unwrap after being shaped about an item. This is an example of poor dead fold characteristics.

As used herein, "creasing" means subjecting the polymeric film to folding where the force applied exceeds the yield strength of the ductile material layers. Such "creasing" induces a permanent set in the film.

As used herein, the term "twistability" means the ability of the polymeric film to be twisted without fracturing or shearing of the entire film and hold the twist once released. Again, aluminum foil is an example of a material with excellent twistability characteristics because once twisted, it will retain the twisted shape. Typical plastic food wraps are examples of poor twistability because of their tendency to untwist once released.

The multilayer film of the present invention may find use in those applications where plastic food wraps and aluminum foil have heretofore found use. The dead fold characteristics of the film make it easy to use to wrap food items and containers, while its transparency and heat resistance render it useful in cooking applications. The film of the present invention may also be formed into a tube, a food item placed therein, and the ends of the tube twisted to secure the food item therein. For example, certain types of candy may be used in such a twisted tube. Foods stored in the film of the present invention may be taken directly from the freezer or refrigerator and placed into the oven for cooking or reheating.

Accordingly, it is an object of the present invention to provide a multilayer film which exhibits good dead fold and/or twistability characteristics and which can withstand conventional oven temperatures. This, and other objects and advantages of the present invention will be apparent from the following detailed description and the appended claims.

DESCRIPTION OF THE PREFERRED EMBODIMENTS

The multilayer film of the present invention comprises alternating layers of a first generally ductile polymeric material and a second generally brittle polymeric material. The film is initially relatively stiffer than present commercially available plastic wraps and easier to handle. This initial stiffness is due to the presence of the brittle layers in the film. When dispensed rom a roll, the film does not exhibit the tendency to fold upon and adhere to itself or the arm of the user that present commercial plastic wraps exhibit.

The first generally ductile polymeric material exhibits at least one, and preferably two, distinct yield points which promote easy cutter bar tearing when dispensed and aid in the inducement of a permanent set upon deformation or folding of the film during use. The yield point may be defined as that point at which the application of strain increases without the application of further tensile stress. Some ductile polymers typically exhibit both an upper and a lower yield point.

Once the application of tensile stress reaches the yield point of the polymer, the elastic limit is exceeded and a permanent set or deformation takes place (i.e.. creasing). Thus, once the film of the present invention is folded to a sharp radius, the tensile strain developed at the radius is above the yield point, and permanent deformation occurs. Once the elastic limit is passed, there is a greatly reduced tendency for the film to spring back to its original shape.

Suitable generally ductile polymeric materials for use in the present invention include polycarbonates, nylons such as 6.6 nylon, and polyolefins such as linear low density polyethylenes, low density polyethylenes, polypropylenes, and polybutylenes. Such polymers are preferably transparent so that the food items wrapped by the film can be seen without the need to unwrap the item. If high temperature stability and a high softening point are needed, the use of 6.6 nylon, which has a softening point in the area of about 490 degrees F. or polycarbonate are particularly preferred. By "softening point" is meant the temperature above which the polymer will begin to flow. The use of such a high softening point polymer renders the film usable in cooking applications involving conventional oven cooking temperatures.

The second material in the film comprises a generally brittle material. The alternating brittle layers in the film give it an initial stiffness and make it easy to handle. As the film is folded during wrapping, the folding action causes the brittle polymer to break up into small fragments. This break up facilitates the reduced spring back tendency of the film. The dead fold characteristics of the film are also enhanced by the fragmentation of the brittle component while the ductile component is more severely deformed near the brittle layer fragmentation, without tearing the entire film. This effectively reduces recovery stresses in the film and causes the ductile material generally adjacent the brittle component fragments to be deformed to a large strain which may be above the yield strength of the ductile material. The dead fold characteristics of the present invention are further enhanced by creasing the film. Preferred generally brittle polymer are general purpose polystyrene, styrene-acrylonitrile copolymers, and poly(vinyl chloride). Again, the brittle polymer is also preferably transparent so that the overall film will also be generally transparent.

The film of the present invention is preferably formed by coextrusion of the layers of polymeric materials. As used herein, the terms "coextrusion" and "extruded sheet" refers to two or more thermoplastic polymeric materials which are brought together from a plurality of extrusion means and placed in contact with one another prior to their exit through an extrusion die to form the extruded film. The film of the present invention may also be formed as a laminate. As used herein, the term "laminate" refers to two or more layers of thermoplastic polymeric materials which are brought together under conditions of high pressure and/or temperature, and/or in the presence of adhesives in order to obtain adherence of the different layers to one another.

The thickness of the film may vary depending upon the particular application desired. For example, if used for containing food during cooking procedures, it may be desirable to increase the thickness of the film somewhat to improve its strength. For typical wrapping applications, however, it is preferred that the film have a thickness of less than about 0.5 mil (0.0127 mm), and most preferably 0.1 to 0.5 mil (0.0025 to 0.0127 mm).

The number of layers comprising the film can also vary. Advantageously, the number of layers can range from about 25 to about 1000, although such numbers depend upon the capability of the coextrusion devices which are employed. It is most desirable to prepare multilayered films having a large number of alternating layers. If the film is laminated, large numbers of layers may be prepared by stacking and then using heat, compression, and/or adhesives to form the laminate.

The volume fractions of the polymeric resins used in the film may also be varied depending on such factors as desired flexibility or stiffness, ease of wrapping or folding and overall strength. As will be appreciated, making the alternating brittle material layers thicker will result in a stiffer film, and vice versa. Preferably, the polymer making up the ductile material will make up from about 50 to about 75% of the overall volume of the film while the brittle polymer will make up from about 50 to about 25% of the overall volume of the film.

The multilayer film of the present invention is most advantageously prepared by employing a multilayer coextrusion device as described in U.S. Pat. Nos. 3,773,882 and 3,884.606 the disclosures of which are hereby incorporated by reference. Such a device provides a method for preparing multilayer, simultaneously extruded thermoplastic polymeric materials, each of which have substantially uniform layer thicknesses. Preferably, a series of layer multiplying means are also employed. Such means are described in U.S. Pat. No. 3,759,647, the disclosure of which is hereby incorporated by reference.

In operation, the feedblock of the coextrusion device receives streams of the first and second thermoplastic resinous materials from a source such as a heat plastifying extruder. The streams of materials are passed to a mechanical manipulating section within the feedblock which serves to rearrange the original streams into a multilayer stream having the requisite number of layers desired in the final product. If desired, however, this multilayer stream is subsequently passed through a series of layer multiplying means in order to further increase the number of layers in the final product.

The multilayer stream is then passed into an extrusion die which is so constructed and arranged that streamlined flow is maintained therein. Such an extrusion die is described in U.S. Pat. No. 3,557.265, the disclosure of which is hereby incorporated by reference. The resultant film is extruded and forms the multilayer film of the present invention. Each layer within the film is generally parallel to the major surface of adjacent layers.

The configuration of the extrusion die can vary and can be such as to reduce the thicknesses of each of the layers in the extruded film. It is preferable that the thickness of the individual layers in the extrusion die be in the range of from about 0.05 to about 50 microns. The precise degree of reduction in the thickness in the layers delivered from the mechanical orienting section, the configuration of the die, and the amount of mechanical working of the film after extrusion are all factors which affect the thickness of the individual layers in the film product.

For certain combinations of first and second polymeric materials, it may be desirable to include an adhesive layer between each successive layer to tie the layers together. Less slippage between layers when the film is folded provides a better permanent deformation of the film. Additionally, conventional cling additives may be extruded with the layers or applied to the film after extrusion. Examples of such cling additives include glycerol dioleate, ethylene-vinyl acetate copolymer grease, petroleum wax, Pebax(trademark) polyester block amide rubber from Rilsan Industries, Inc., and Vitel PE-200(trademark) polyester resin from Goodyear.

The multilayer film of the present invention may be formed as a continuous web and dispensed from a roll as is conventional. The film may also be formed as an extruded tube or be edge sealed to form a tube.

In order that the invention may be more readily understood reference is made to the following examples, which are intended to illustrate the invention, but are not to be taken as limiting the scope thereof.

EXAMPLE 1

Hysteresis tests utilizing an Instron Tensile Tester were conducted as a technique for measuring the dead fold characteristics of a number of multilayer films within the scope of the present invention. As controls, a monolayer nylon film and an aluminum foil were also tested. Test specimens were one inch in width and two inches in gage length. Each of the test specimens was stretched to the same arbitrary strain level and then immediately unloaded. A crosshead speed of two inches per minute was used for both loading and unloading of the test specimens.

Both the arbitrary strain level($\epsilon rb$) and the permanent deformation strain points($\epsilon df$) were recorded. The Yield point strain($\epsilon yp$) of each test specimen was also measured. The difference between the arbitrary strain level and the permanent strain point, $\Delta \epsilon$, is the recoverable portion of the applied strain. Therefore, the smaller the $\Delta \epsilon$, the better the dead fold characteristics of the film.

Several tests were performed with films of each test specimen. The scatter of $\Delta \epsilon$ values was measured for all test specimens and was found to be small (i.e., less than 5% scatter on the average). The average values for all specimens tested is reported in Table I below. At least five tests were performed for each specimen.

TABLE I

| Test Specimen | $\epsilon yp$ | $\Delta \epsilon$ |
| --- | --- | --- |
| Nylon[1] | none | 8.2% |
| 75/25 Nylon/GPPS[2] | 4.8% | 4.1% |
| 50/50 Nylon/GPPS[3] | 4.0% | 3.3% |
| 50/50 LLDPE/GPPS[4] | 4.3% | 3.6% |
| Aluminum foil[5] | <1% | 0.8% |

[1] The nylon control was Celanese N186D, a 6,6 nylon available from Celanese Corp.
[2] Nylon was Celanese N186D; general purpose polystyrene was Styron 685D, available from the Dow Chemical Company; percentages are by weight; 49 alternating layers.
[3] Same as 2 above except that a 50/50 weight mixture was used; 49 alternating layers.
[4] Linear low density polyethylene was Dow 2032 available from the Dow Chemical Company; GPPS was same as in 2 and 3; 97 alternating layers.
[5] Anaconda brand aluminum foil; 0.65 mil thick.

Neither the nylon control nor the linear low density polyethylene possessed distinct yield points. Surprisingly, by incorporating general purpose polystyrene layers into the film, distinct yield points were created. As can be seen, the multilayer films having alternating ductile and brittle layers of material exhibited improved dead fold characteristics over the nylon control film alone. The $\Delta \epsilon$ values for the test film specimens was only about one half or less than that of the control film.

EXAMPLE 2

Films having twistability characteristics were produced utilizing nylon 6,6 as the ductile material and general purpose polystyrene as the brittle material. Films having from 3 to 200 layers were tested and compared with films of nylon 6,6 alone. The three and five layer films (with polystyrene layers sandwiched between nylon 6,6) upon twisting demonstrated catastrophic failure of the polystyrene film into pieces which were visible to the eye. These films held their twist upon release, while the nylon 6,6 films did not. Films having 50-200 alternating layers produced by the microlayer coextrusion technique previously discussed held their twists even better than the three and five later films. However, no visible failure of the polystyrene layers was observed.

This film is believed to be suitable when formed as a tube to contain food items therein. The tube would be sealed by twisting the ends thereof.

While certain representative embodiments and details have been shown for purposes of illustrating the invention, it will be apparent to those skilled in the art that various changes in the methods and apparatus disclosed herein may be made without departing from the scope of the invention which is defined in the appended claims.

What is claimed is:

1. A multilayer film comprising at least 25 alternating layers of a first material and a second material, said first material comprising a ductile polymeric material having at least one distinct yield point, and wherein said first material is selected from the group consisting of polycarbonate, polyolefin, and nylon, said second material comprising a brittle polymeric material capable of fracturing upon the application of tensile stress and wherein said second material is selected from the group consisting of polystyrene, styrene-acrylonitrile copolymer, and poly (vinyl chloride), and the number of alternating layers being sufficient to cause said film to exhibit dead fold, creasing, and/or twistability characteristics.

2. The film of claim 1 wherein said polyolefin is selected from the group consisting of linear low density polyethylene, low density polyethylene, polypropylene, and polybutylene.

3. The film of claim 1 wherein said film is coextruded.

4. The film of claim 1 wherein alternating layers of said film are laminated together.

5. The film of claim 1 wherein said film is generally transparent.

6. A multilayer film having a softening point of at least about 450 degrees F, said film comprising at least 25 alternating layers of a first material and a second material, said first material comprising a ductile polymeric material having at least one distinct yield point and wherein said first material is selected from the group consisting of polycarbonate and nylon, said second material comprising a brittle polymeric material capable of fracturing upon the application of tensile stress and wherein said second material is selected from the group consisting of polystyrene, styrene-acrylonitrile copolymer, and poly (vinyl chloride), and the number of alternating layers being sufficient to cause said film to exhibit dead fold and/or twistability characteristics.

7. The film of claim 6 wherein said film is coextruded.

8. The film of claim 6 wherein alternating layers of said film are laminated together.

9. The film of claim 6 wherein said film is generally transparent.

10. The film of claim 1 in which said first material is nylon and said second material is general purpose polystyrene.

11. The film of claim 1 in which from about 50 to about 75% by volume of said film is nylon and from about 50 to about 25% by volume of said film is general purpose polystyrene.

12. The film of claim 1 in which said first material is linear low density polyethylene and said second material is general purpose polystyrene.

13. A multilayer film consisting essentially of at least 25 alternating layers of a first generally ductile polymeric material selected from the group consisting of nylon and linear low density polyethylene and a second generally brittle polymeric material comprising general purpose polystyrene capable of fracturing upon the application of tensile stress.

14. The multilayer film of claim 13 in which said first material is nylon.

15. The multilayer film of claim 14 in which from about 50 to about 75% by volume of said film is nylon and from about 50 to about 25% by volume of said film is general purpose polystyrene.

16. The multilayer film of claim 13 in which said first material is linear low density polyethylene.

* * * * *